United States Patent [19]

Kawajiri et al.

[11] Patent Number: 4,964,294
[45] Date of Patent: Oct. 23, 1990

[54] NON-RESONATING TYPE KNOCK SENSOR

[75] Inventors: Shogo Kawajiri; Akio Ito; Katsumi Yamamoto, all of Nagoya, Japan

[73] Assignee: NGK Spark Plug Co., Ltd., Aichi, Japan

[21] Appl. No.: 394,363

[22] Filed: Aug. 15, 1989

[30] Foreign Application Priority Data

| Sep. 12, 1988 | [JP] | Japan | 63-120062 |
| Feb. 18, 1989 | [JP] | Japan | 1-38925 |
| Feb. 21, 1989 | [JP] | Japan | 1-42550 |
| Feb. 21, 1989 | [JP] | Japan | 1-42551 |

[51] Int. Cl.$^5$ .................. G01L 23/22; G01P 15/09
[52] U.S. Cl. .................................... 73/35; 310/329
[58] Field of Search .................. 73/35, 654; 310/329

[56] References Cited

U.S. PATENT DOCUMENTS

4,399,705  8/1983  Weiger et al. ................. 73/35

*Primary Examiner*—John Chapman
*Attorney, Agent, or Firm*—Darby & Darby

[57] ABSTRACT

A non-resonating type knock sensor for an internal combustion engine is disclosed which has an annular piezoelectric element secured within a case on which a connector is integrally formed to send a piezoelectric voltage signal generated from the piezoelectric element outside of the sensor. The piezoelectric element has a non-polarized portion at a position adjacent to the connector so that a vibration transmitted from the connector to the piezoelectric element does not substantially cause the piezoelectric element to generate an electrical output.

12 Claims, 8 Drawing Sheets

NON-RESONATING TYPE KNOCK SENSOR

BACKGROUND OF THE INVENTION

This invention relates to a non-resonating type knock sensor adapted to be secured to an internal combustion engine for detecting the occurrence of knocking of the engine.

There is a known non-resonating type knock sensor which comprises a synthetic resin case adapted to be secured to a suitable portion of an internal combustion engine, an annular piezoelectric element fixedly disposed within the case and having a pair of electrodes on both sides thereof, a pair of terminal pins each in electrical contact with respective electrodes, and a cylindrical connector wall extending radially outward from the piezoelectric element for surrounding the terminal pins (Japanese Published Unexamined Patent Application (Tokkyo Kokai) No. 61-153,530).

With such a non-resonating type knock sensor, the vibration from knocking imposes a compressive strain on the piezoelectric element proportionally to the knocking frequency so that a piezoelectric voltage signal is generated from the piezoelectric element in accordance with the vibration. The output signal is picked up by the lead wire and is transmitted outside of the sensor from the connector pins through a coupler connected to the connector.

The present inventors have found that the knock sensor of the non-resonating type tends to generate noises so that the knocking of the engine is failed to be precisely detected.

BRIEF SUMMARY OF THE INVENTION

It is, therefore, the prime object of the present invention to provide a knock sensor of a non-resonating type which can precisely detect the occurrence of knocking of an internal combustion engine.

In accomplishing the above object, there is provided in accordance with the present invention a non-resonating type knock sensor for an internal combustion engine, comprising a cylindrical body having a through hole and adapted to be mounted on the engine by a bolt inserted through the through hole, a cylindrical connector wall extending radially outwardly from the cylindrical body, an annular piezoelectric element coaxially disposed in and embedded within the wall of said cylindrical body and having a pair of electrodes on both sides thereof, and a pair of terminal pins extending axially within said connector wall and each in electrical contact with respective one of said electrodes, characterized in that said piezoelectric element has a non-polarized portion at a position adjacent to said connector wall so that a vibration transmitted from said connector wall to said piezoelectric element does not substantially cause said piezoelectric element to generate an electrical output.

The present inventors have found that the noises picked up by the sensor are attributed to a vibration transmitted from the connector of the sensor, which vibration is to be discriminated from that caused by knocking. Thus, the knock sensor according to the present invention is sensible only to vibration by knocking, enabling precise detection of the knocking.

BRIEF DESCRIPTION OF THE DRAWINGS

Other objects, features and advantages of the present invention will become apparent from the detailed description of the preferred embodiment of the invention which follows, when considered in light of the accompanying drawings, in which.

DESCRIPTION OF THE PREFERRED EMBODIMENTS

Figure 1:
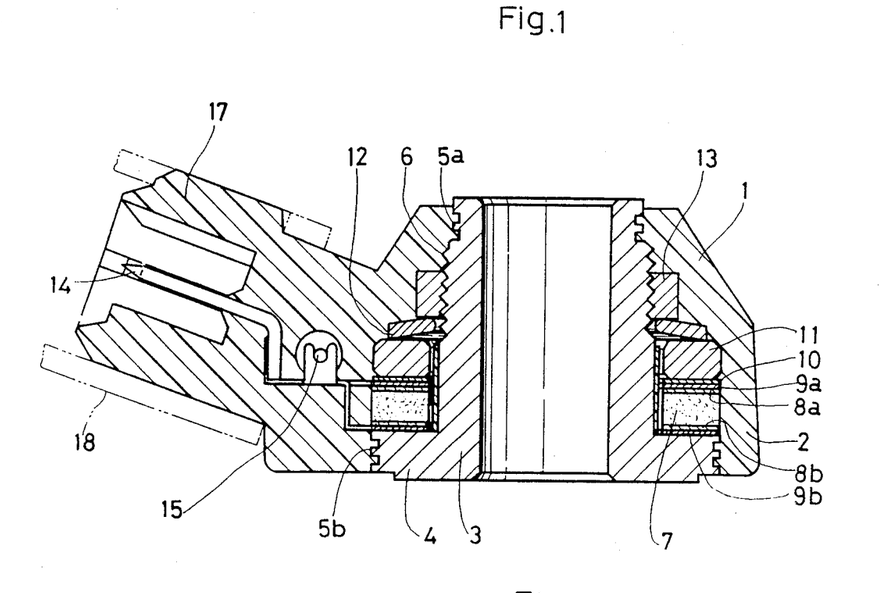
FIG. 1 is an elevational, cross-sectional view diagrammatically showing a knock sensor embodying the present invention.

FIG. 1 depicts an example of a non-resonating type knock sensor. The reference numeral 1 denotes a case formed of a synthetic resin and having a cylindrical body 2. A sleeve 3 formed of a metal is mounted within the cylindrical body 2. The sleeve 3 has a flange portion 4 at the lower end thereof and an external thread 6 in the upper portion thereof. Outer peripheries of the both ends of the sleeve are shaped to have a serrated or rugged cross section 5a and 5b, as illustrated, to improve the tightness in connection between the sleeve 3 and the case 1.

An annular piezoelectric element 7 is disposed in the case 1 generally coaxially with the sleeve 3 and is received by the flange 4 of the sleeve 3. The element 7 has a pair of electrodes 8a and 8b on both sides thereof which are in electrical contact with upper and lower electrode plates 9a and 9b. Disposed above the upper electrode plate 9a are an insulator plate 10, a weight 11 and a washer 12 in this order and these parts are tightly assembled and connected to the sleeve 3 by means of a nut 13 engaged with the thread 6 of the sleeve 3. The resulting assembly is encapsulated or surrounded by the case 1 by casting in a mold.

A cylindrical, connector wall 17 extends radially outwardly from an intermediate portion of the cylindrical body 2. Within the connector wall 17, there are provided a pair of axially extending terminal pins 14 (only one pin is shown in FIG. 1) which are electrical contact with the paired electrodes 8a and 8b of the piezoelectric element 7 through resistors 15 and the electrode plates 9a and 9b.

The thus constructed knock sensor is tightly secured to an appropriate portion of an internal combustion engine by a bolt (not shown) inserted through the through hole of the cylindrical body 2 and a female coupler 18 shown by the phantom line is connected to the connector 17. When knocking occurs in the engine, a strain in the axial direction of the sleeve 3 is transmitted to the piezoelectric element so that a potential difference is created in the piezoelectric element. The piezoelectric voltage signal is picked up by the electrode plates 9a and 9b and is transmitted out of the system through the female coupler 18.

Figure 2A:
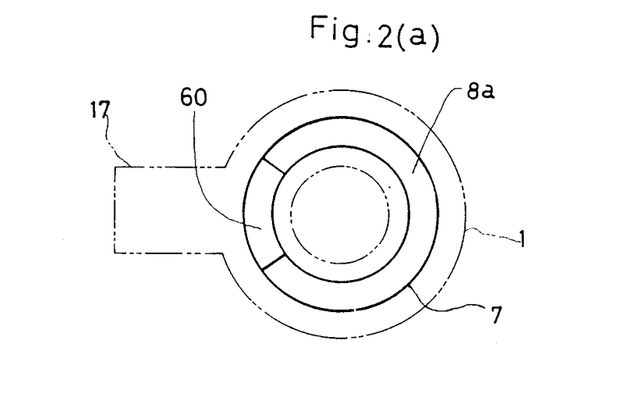
FIG. 2(a) is a plan view schematically showing a piezoelectric element of FIG. 1.

As shown in FIG. 2(a), the piezoelectric element 7 has a non-polarized portion 60 at a position adjacent to the connector wall 17 so that a vibration transmitted from the connector wall 17 to the piezoelectric element 7 does not substantially cause generation of an electrical output from the piezoelectric element 7. That is, while a vibration from the connector wall 17 has a directional component parallel with the axial direction of the sleeve 3, the piezoelectric element 7 does not generate an electrical output even when the element receives a compressive strain in the non-polarized portion 60.

Figure 11A:
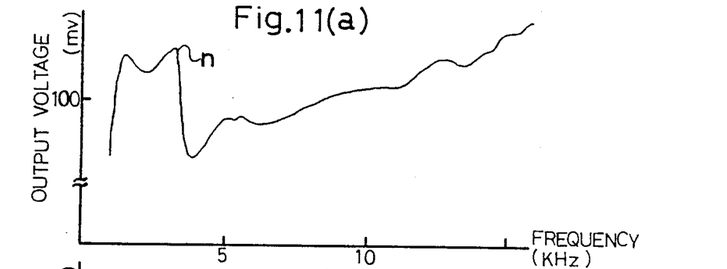
FIG. 11(a) is a graph showing frequency-output voltage characteristic obtained with the conventional knock sensor.
Figure 11B:
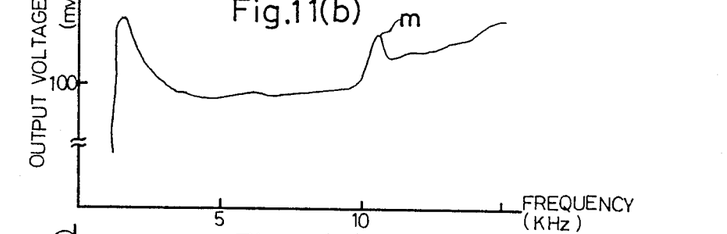
FIGS. 11(b) and 11(c) are graphs, similar to FIG. 11(a), in the case of the knock sensor according to the present invention.

Thus, as shown in FIG. 11(a), with the conventional knock sensor, in which such a non-polarized portion 60 is not provided, there is generated a noise signal "n". In contrast, as shown in FIG. 11(b), with the knock sensor according to the present invention, such a noise is eliminated.

Figure 2B:
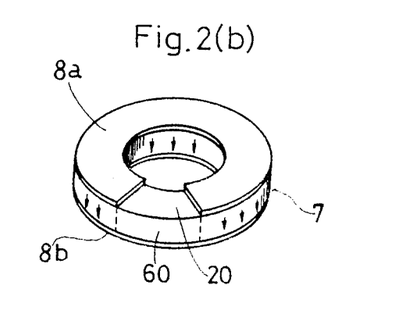
FIGS. 2(b), 3 and 4 are perspective views showing various electrode patterns on the piezoelectric element.

Such a non-polarized portion 60 may be formed in a variety of methods. One example is shown in FIG. 2(b), in which a portion of at least one of the electrodes 8a and 8b (8a alone in the illustrated case) is cut away to form an electrode-free portion 20. Then a direct voltage is impressed between the two electrodes 8a and 8b. As a result, that portion of the piezoelectric element 7 which is provided with the electrode is polarized, with the remaining portion 60 corresponding to the electrode free portion 20 being kept not polarized.

The size of the non-polarized portion 60 is not specifically limited but is determined by desired degree of the elimination of the noise while considering the stability in sensitivity of the sensor. Very good results can be obtained when the angle $\theta$ of the non-polarized portion 60 is in the range of 60°–110°.

Figure 3:
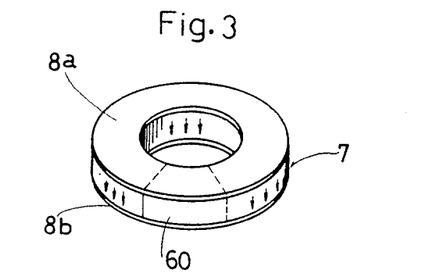

In the embodiment shown in FIG. 3, both sides of the piezoelectric element are provided entirely with the electrodes 8a and 8b and a direct voltage is applied therebetween to polarize the entire element 7. Thereafter, a desired portion of the element 7 is heated with a suitable means such as a soldering iron to a Curie temperature of the element 7 (about 400° C. in the case of lead titanate piezoelectric element), thereby to form a non-polarized portion 60 in the above-said desired portion.

Figure 4:
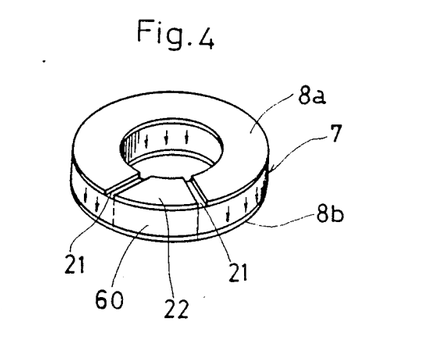

In the embodiment shown in FIG. 4, both sides of the piezoelectric element are provided entirely with the electrodes 8a and 8b and a direct voltage is applied therebetween to polarize the entire element 7. Thereafter, slits 21 are formed to form a separated electrode 22 therebetween. Then, a direct voltage is impressed to the electrode 22 in the direction opposite to the previously applied direction to form a non-polarized portion 60 of a size corresponding to the separated electrode 22.

Figure 12:
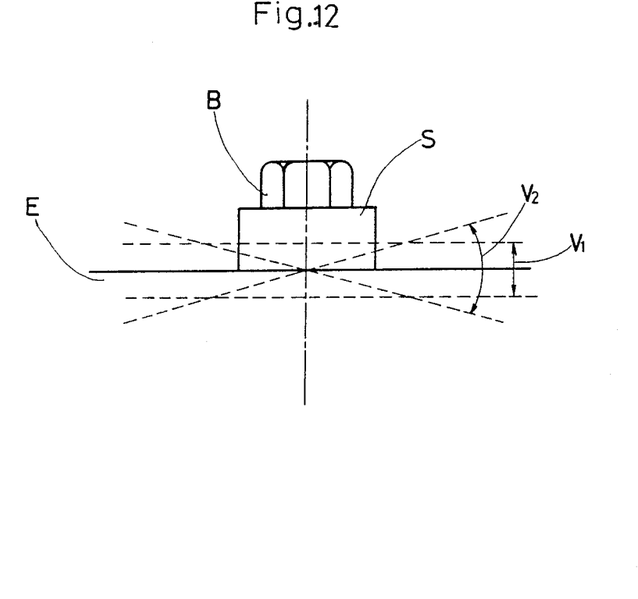
FIG. 12 is an explanatory view showing waviness vibration caused in knock sensor.

Referring to FIG. 12, the non-resonating knock sensor S of the present invention is tightly fixed to a suitable portion E, such as a cylinder head or a cylinder block, of an engine with a bolt B and generates an output signal proportional to the magnitude of the engine vibration. Since the vibration involves a waviness vibration $V_2$ as well as an ordinary longitudinal vibration $V_1$, a strain caused by the waviness vibration $V_2$ is alternately imposed on a first portion of the piezoelectric element positioned adjacent to the connector and a second portion thereof positioned diametrically opposite to the first portion, with the center of the piezoelectric element serving as a fulcrum. As a result, as shown in FIG. 11b, with the knock sensor having a piezoelectric element as shown in FIGS. 2–4, a noise "m" attributed to the waviness vibration $V_2$ is generated at a specific frequency.

Figure 5:
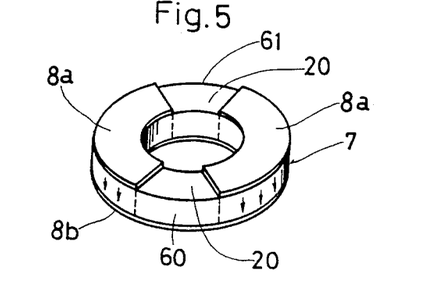
FIGS. 5-7 are perspective views showing modifications of the embodiments shown in FIGS. 2(b), 3 and 4 respectively.
Figure 6:
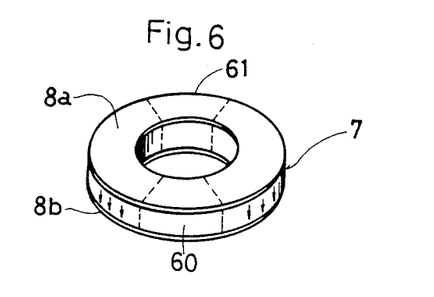
Figure 7:
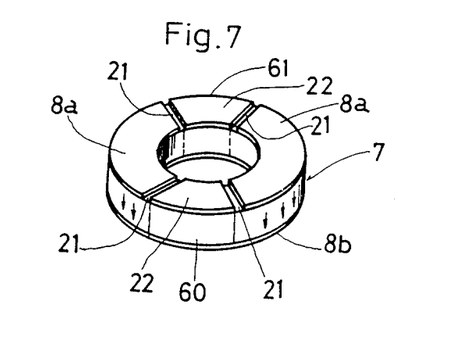
Figure 11C:
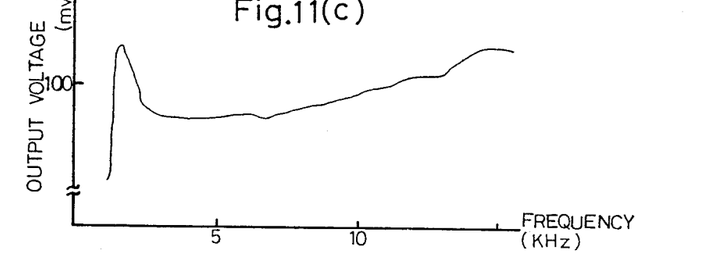

FIGS. 5–7 illustrate embodiments according to the present invention in which the above problem has been overcome. These embodiments are similar to those of FIGS. 2(b), 3 and 4 except that another non polarized portion 61 is provided in the piezoelectric element 7 at a position substantially diametrically opposite to non-polarized portion 60. By this arrangement, as shown in FIG. 11(c), such a noise is eliminated.

In the embodiment shown in FIG. 5, two symmetrical portions of at least one of the electrodes 8a and 8b are cut away to form two electrode-free portions 20. Then a direct voltage is impressed between the two electrodes 8a and 8b. As a result, those portions of the piezoelectric element 7 which are provided with the electrode are polarized, with the remaining portions 60 and 61 corresponding to the electrode free portions 20 being kept not polarized.

In the embodiment shown in FIG. 6, both sides of the piezoelectric element 7 are provided entirely with the electrodes 8a and 8b and a direct voltage is applied therebetween to polarize the entire element 7. Thereafter, two symmetrical portions of the element 7 are heated with a suitable means such as a soldering iron to a Curie temperature of the element 7, thereby to form non-polarized portions 60 and 61 in the above-said symmetrical portions.

In the embodiment shown in FIG. 7, both sides of the piezoelectric element are provided entirely with the electrodes 8a and 8b and a direct voltage is applied therebetween to polarize the entire element 7. Thereafter, slits 21 are formed to form separated electrodes 22. Then, a direct voltage is impressed to the electrodes 22 in the direction opposite to the previously applied direction to form non-polarized portions 60 and 61 of a size corresponding to the separated electrodes 22.

Since the presence of the electrode-free portions 20 prevents uniform pressure contact between the piezoelectric element and a fixation means therefor, there is caused a difference between a pressure received by the electrode-free portions and that received by the electrode-existing portions, resulting in dispersion or non-uniformity of output characteristics of piezoelectric elements. This becomes especially conspicuous when there are formed two electrode-free portions like in the embodiments shown in FIGS. 5, though the embodiments shown in FIGS. 6 and 7 are substantially free of such problems.

The problems involved in the embodiments shown in FIGS. 2(b) and 5 have been overcome in the embodiment shown in the following embodiments.

Figure 8A:
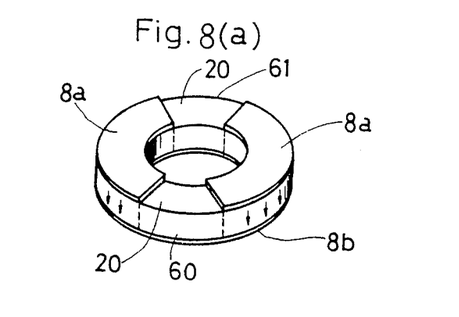
FIGS. 8(a)-8(b) and 9(a)-9(c) are perspective views explanatory of a method of forming further, piezoelectric element structure of the present invention.
Figure 8B:
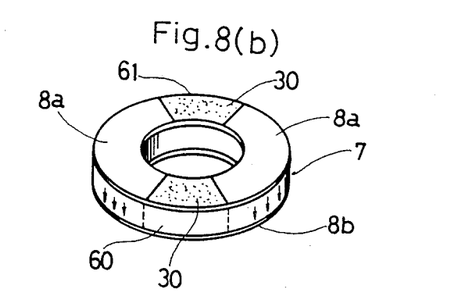

Referring to FIGS. 8(a) and 8(b), a piezoelectric element is provided on both sides thereof with silver electrodes 8a and 8b formed, for example, by applying a coating or by printing. Two symmetrical portions of at least one of the electrodes 8a and 8b are cut away to form two electrode-free portions 20. Then a direct voltage is impressed between the two electrodes 8a and 8b so that those portions of the piezoelectric element 7 which are provided with the electrode are polarized, with the remaining portions 60 and 61 corresponding to the electrode free portions 20 being kept not polarized.

Then a filler such as a silicone or the like resin, a grease, or a paint inclusive of a conductive one is applied to the electrode free portions 20 so that the upper surface of the layers 30 thus provided in the portions 20 has the same height as the surface of the electrodes 8a and 8b. The filler layers 30 also serve to compensate the surface roughness or warp of the piezoelectric elements. As a consequence, the surface of the electrode-carrying piezoelectric element has improved flatness and smoothness and is able to uniformly contact with the electrode plates 9a and 9b (FIG. 1), thereby improving uniformity of output characteristics of the piezoelectric elements. The above polarization treatment can be carried out after the formation of the filler layers 30, if desired.

Figure 9A:
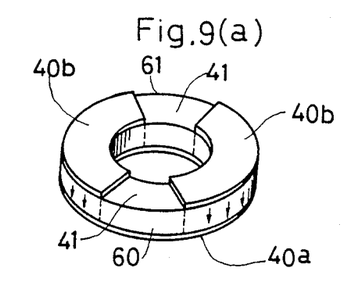
Figure 9B:
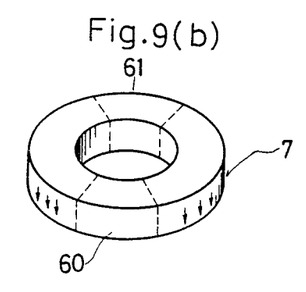
Figure 9C:
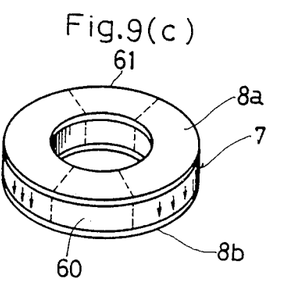

Referring to FIGS. 9(a)-9(c), a piezoelectric element is provided on both sides thereof with silver electrodes 40a and 40b formed. Two symmetrical portions of at least one of the electrodes 40a and 40b are cut away to form two electrode-free portions 41. Then a direct voltage is impressed between the two electrodes 40a and 40b so that those portions of the piezoelectric element 7 which are provided with the electrode are polarized, with the remaining portions 60 and 61 corresponding to the electrode free portions 41 being kept not polarized (FIG. 9(a)). Thereafter, the electrodes 40a and 40b are removed by, for example, grinding or chemical etching (FIG. 9(b)). In this case, if the electrode-free portions 41 have been formed in only one of the electrodes 40a and 40b, it is sufficient to remove that electrode provided with the electrode-free portions 41. On the resulting surfaces of the piezoelectric element are then formed new electrodes 8a and 8b by silver coating or by a thin film applying method such as vacuum deposition (FIG. 9(c)). The thus prepared piezoelectric elements have smooth, flat surfaces and exhibit uniform output characteristics.

Figure 10:
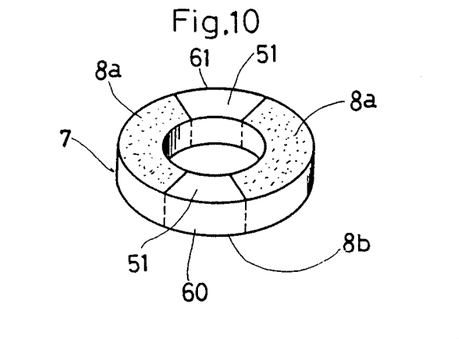
FIG. 10 is a perspective view showing a further, piezoelectric element structure of the present invention.

Referring to FIG. 10, a piezoelectric element 7 is provided on both sides thereof with thin film electrodes 8a and 8b utilizing, for example, vacuum deposition or screen printing technique. Electrode-free portions 51 are formed simultaneously with or after the formation of the electrodes 8a and 8b. Screen printing is suited for the simultaneous formation of the electrodes 8a and 8b and electrode-free portions 51. Chemical etching or grinding may be adopted for the formation of the electrode-free portions after the formation of the electrodes 8a and 8b. Because the electrodes 8a and 8b are very thin in thickness, the presence of the electrode-free portions 51 does not cause non-uniformity of piezoelectric voltage output characteristics of the elements.

Shown in Table below are the results of a test conducted for the purpose of comparing output characteristics of sensors having the piezoelectric element as shown in FIG. 5 (Type A) and those of sensors having the piezoelectric element as shown in FIG. 8(b) (Type B).

TABLE

|        |                    | Vibration Applied (KHz) | | | | |
|--------|--------------------|-----|-----|-----|------|-------|
|        |                    | 2.5 | 4.5 | 7.0 | 10.0 | 15.0  |
| Type A | Average            | 83.9| 83.3| 88.5| 98.6 | 120.2 |
|        | Standard deviation | 4.9 | 4.5 | 5.0 | 7.0  | 8.3   |
| Type B | Average            | 88.1| 86.6| 91.6| 100.0| 121.0 |
|        | Standard deviation | 3.4 | 2.9 | 3.2 | 4.0  | 5.0   |

The test was carried out as follows: 100 Test samples were prepared for each of the Type A and Type B sensors. Each sample was mounted on a vibration test machine for measuring output voltage at frequencies in the range of 2.5-15.0 KHz, from which average output voltages and standard deviations were calculated. The standard deviation is defined by the following equation:

$$\text{Standard deviation} = \left( \sum_{i=1}^{100} (V_i - V_A)^2 \right) / 100$$

wherein $V_A$ represents the average output voltage and $V_i$ represents the output voltage of each of the 100 samples.

As is evident from the results shown in Table above, the provision of the filler layer 30 within the electrode-free portions 20 is effective to reduce the standard deviation in output characteristics.

What is claimed is:

1. A non-resonating type knock sensor for an internal combustion engine, comprising a cylindrical body having a through hole and adapted to be mounted on the engine by a bolt inserted through the through hole, a cylindrical connector wall extending radially outwardly from the cylindrical body, an annular piezoelectric element coaxially disposed in and embedded within the wall of said cylindrical body and having a pair of electrodes on both sides thereof, and a pair of terminal pins extending axially within said connector wall and each in electrical contact with respective one of said electrodes, characterized in that said piezoelectric element has a non-polarized portion at a position adjacent to said connector wall so that a vibration transmitted from said connector wall to said piezoelectric element does not substantially cause said piezoelectric element to generate an electrical output.

2. A knock sensor according to claim 1, wherein said piezoelectric element has another non-polarized portion at a position substantially diametrically opposite to said non-polarized portion adjacent to said connector wall.

3. A knock sensor according to claim 1, wherein said piezoelectric element has been obtained by a method including the steps of:
   providing an annular, non-polarized piezoelectric element;
   forming a conductive layer over the entire surface of each side of the non-polarized piezoelectric element;
   removing a portion of at least one of said conductive layer;
   applying a direct voltage across the opposing conductive layers so that the piezoelectric element is polarized while a portion thereof adjacent to said removed portion remains not polarized and forms said non-polarized portion.

4. A knock sensor according to claim 3, wherein said opposing conductive layers having said removed portion serve as said electrodes.

5. A knock sensor according to claim 4, wherein each of said conductive layers is in the form of a thin film.

6. A knock sensor according to claim 4, wherein said method further includes the step of filling said removed portion with a filler so that each of said electrodes has a flat surface.

7. A knock sensor according to claim 3, wherein said method further includes the steps of, after the formation of said non-polarized portion, removing the remaining conductive layers from the piezoelectric element, and then forming another conductive layer over the entire surface of each side thereof to form said electrodes.

8. A knock sensor according to claim 2, wherein said piezoelectric element has been obtained by a method including the steps of:
provided an annular, non-polarized piezoelectric element;
forming a conductive layer over the entire surface of each side of the non-polarized piezoelectric element;
removing first and second portions of at least one of said conductive layer, said first and second portions being located at a position diametrically opposite to each other;
applying a direct voltage across the opposing conductive layers so that the piezoelectric element is polarized while portions thereof adjacent to said first and second portions remain not polarized and form said non-polarized portions.

9. A knock sensor according to claim 8, wherein said opposing conductive layers from which said first and second portions have been removed serve as said electrodes.

10. A knock sensor according to claim 9, wherein each of said conductive layers is in the form of a thin film.

11. A knock sensor according to claim 9, wherein said method further includes the step of filling said first and second portions with a filler so that each of said electrodes has a flat surface.

12. A knock sensor according to claim 8, wherein said method further includes the steps of, after the formation of said non-polarized portions, removing the remaining conductive layers from the piezoelectric element, and then forming another conductive layer over the entire surface of each side thereof to form said electrodes.

* * * * *